UNITED STATES PATENT OFFICE.

WILLIAM H. SEAMON, OF EL PASO, TEXAS.

PROCESS OF MAKING HYDROCHLORIC ACID AND CALCIUM CARBID.

No. 826,614.    Specification of Letters Patent.    Patented July 24, 1906.

Application filed March 14, 1906. Serial No. 306,064.

*To all whom it may concern:*

Be it known that I, WILLIAM H. SEAMON, a citizen of the United States, residing at El Paso, in the county of El Paso and State of Texas, have invented certain new and useful Improvements in Processes for Making Hydrochloric-Acid Gas and Calcium Carbid; and I do hereby declare the following to be a full, clear, and exact description of the invention, such as will enable others skilled in the art to which it appertains to make and use the same.

This invention relates to new and useful processes in treating fused calcium chlorid with acetylene gas or other gases mixed therewith, whereby hydrochloric-acid gas and calcium carbid may be produced, and the advantages derived comprise the utilization of calcium chlorid, which is now a waste product in chemical industries and produced in enormous quantities and which by my improved processes is made a valuable product, as by the utilization of pure acetylene gas or hydrocarbon gases mixed therewith I am able not only to manufacture the hydrochloric-acid gas by a cheaper process than with processes now employed and also produce a calcium carbid economically.

In carrying out the steps of my process calcium chlorid is brought to a fused state in any suitable furnace in which coal, wood, gaseous fuel, or even electricity may be employed for such purpose, after which acetylene gas, either pure or mixed with other gases which are rich in hydrocarbon, is introduced under a moderate pressure through a pipe into the fused mass of calcium chlorid, after which the following reaction takes place—*i. e.*, $CaCl_2 + C_2H_2 = CaC_2 + 2HCl$. The hydrochloric acid passes off from the fused mass in a gaseous state and is condensed by water, as now the practice in the present methods of making hydrochloric acid. The calcium carbid remains in the furnace and may be removed when the reaction is ended, after which a new supply of calcium chlorid may be added.

From the foregoing it will be noted that an improved method is afforded for economically manufacturing hydrochloric-acid gas and also calcium carbid from calcium chlorid from what is at present a waste product and which is produced in large quantities.

What I claim is—

1. The process of making calcium carbid and hydrochloric acid which consists in fusing calcium chlorid and passing gaseous hydrocarbons through the fused mass, converting the calcium chlorid to calcium carbid, and collecting the hydrochloric acid thus produced, as set forth.

2. The process of making calcium carbid and hydrochloric acid which consists in fusing calcium chlorid and passing acetylene through the fused mass, converting the calcium chlorid to calcium carbid, and collecting the hydrochloric acid thus produced, as set forth.

In testimony whereof I hereunto affix my signature in the presence of two witnesses.

WILLIAM H. SEAMON.

Witnesses:
 CYRUS H. JONES,
 THOS. M. JONES.